(12) United States Patent
Brodersen et al.

(10) Patent No.: US 8,612,857 B2
(45) Date of Patent: Dec. 17, 2013

(54) MONITOR CONFIGURATION FOR MEDIA DEVICE

(75) Inventors: Rainer Brodersen, San Jose, CA (US); Jeffrey Robbin, Los Altos, CA (US); Thomas Michael Madden, Sunnyvale, CA (US); Kevin Arnold, Los Gatos, CA (US); Ian Hendry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1062 days.

(21) Appl. No.: 11/621,048

(22) Filed: Jan. 8, 2007

(65) Prior Publication Data

US 2008/0165083 A1 Jul. 10, 2008

(51) Int. Cl.
*G06F 3/00* (2006.01)

(52) U.S. Cl.
USPC ........................................................ 715/718

(58) Field of Classification Search
USPC .................................. 715/718; 345/698, 699
See application file for complete search history.

(56) References Cited

U.S. PATENT DOCUMENTS

| | | | |
|---|---|---|---|
| 5,283,864 A | 2/1994 | Knowlton |
| 5,303,388 A | 4/1994 | Kreitman et al. |
| 5,345,543 A | 9/1994 | Capps et al. |
| 5,396,590 A | 3/1995 | Kreegar |
| 5,452,414 A | 9/1995 | Rosendahl et al. |
| 5,864,868 A | 1/1999 | Contois |
| 6,006,227 A | 12/1999 | Freeman et al. |
| 6,346,951 B1 | 2/2002 | Mastronardi |
| 6,638,313 B1 | 10/2003 | Freeman et al. |
| 6,725,427 B2 | 4/2004 | Freeman et al. |
| 6,768,999 B2 | 7/2004 | Prager et al. |
| 7,055,104 B1 | 5/2006 | Billmaier et al. |
| 7,085,590 B2 | 8/2006 | Kennedy et al. |

(Continued)

FOREIGN PATENT DOCUMENTS

| EP | 1161084 | 5/2001 |
|---|---|---|
| EP | 1244301 | 9/2002 |

(Continued)

OTHER PUBLICATIONS

Kuhnen Leila, Authorized officer, European Patent Office, Application No. PCT/US2008/050537, filed Jan. 8, 2008, in International Search Report and Written Opinion of the International Searching Authority, mailed Jul. 7, 2008, 12 pages.

(Continued)

*Primary Examiner* — Aaron M Richer
(74) *Attorney, Agent, or Firm* — Schwegman Lundberg & Woessner, P.A.

(57) ABSTRACT

A display mode can be selected by identifying a plurality of display modes supported by a media client, wherein the plurality of display modes comprise safe modes; sequentially selecting a display mode from the plurality of display modes, wherein the plurality of display modes are ordered according to one or more of resolution, timing, and popularity; generating an output signal based on the selected display mode, wherein the generated output signal is provided to a display device; and selectively repeating the sequential selection of a display mode and generating an output signal based on the selected display mode until an input is received from a user indicating that the selected display mode is compatible with the display device. Further, the media client can be configured to utilize the selected display mode. Additionally, the plurality of display modes can be identified based on extended display identification data from the display device.

25 Claims, 5 Drawing Sheets

(56) References Cited

U.S. PATENT DOCUMENTS

| | | | |
|---|---|---|---|
| 7,176,980 B2* | 2/2007 | Stone et al. | 348/558 |
| 7,231,607 B2 | 6/2007 | Neely et al. | |
| 7,581,186 B2 | 8/2009 | Dowdy et al. | |
| 7,812,890 B2 | 10/2010 | Chiu | |
| 2001/0015719 A1 | 8/2001 | Van et al. | |
| 2002/0030699 A1 | 3/2002 | Van | |
| 2002/0067373 A1 | 6/2002 | Roe et al. | |
| 2002/0067376 A1 | 6/2002 | Martin et al. | |
| 2002/0080180 A1 | 6/2002 | Mander et al. | |
| 2002/0113824 A1 | 8/2002 | Myers | |
| 2003/0020671 A1 | 1/2003 | Santoro et al. | |
| 2003/0112367 A1* | 6/2003 | Kang et al. | 348/441 |
| 2004/0013416 A1 | 1/2004 | Mok | |
| 2004/0070593 A1 | 4/2004 | Neely et al. | |
| 2004/0146287 A1 | 7/2004 | Jeon | |
| 2004/0199582 A1 | 10/2004 | Kucharewski et al. | |
| 2005/0091596 A1 | 4/2005 | Anthony et al. | |
| 2005/0160468 A1 | 7/2005 | Rodriguez et al. | |
| 2006/0007359 A1* | 1/2006 | Douangphachanh | 348/554 |
| 2006/0132473 A1 | 6/2006 | Fuller et al. | |
| 2006/0150123 A1 | 7/2006 | Goodwin et al. | |
| 2006/0195790 A1 | 8/2006 | Beaupre et al. | |
| 2007/0033537 A1 | 2/2007 | Mander et al. | |
| 2007/0044036 A1 | 2/2007 | Ishimura et al. | |
| 2007/0271508 A1 | 11/2007 | Audet | |
| 2008/0036743 A1 | 2/2008 | Westerman et al. | |
| 2008/0062141 A1 | 3/2008 | Chandhri | |
| 2008/0066135 A1 | 3/2008 | Brodersen et al. | |
| 2009/0002335 A1 | 1/2009 | Chaudhri | |
| 2009/0177989 A1 | 7/2009 | Ma et al. | |
| 2009/0307623 A1 | 12/2009 | Agarawala et al. | |
| 2009/0319949 A1 | 12/2009 | Dowdy et al. | |

FOREIGN PATENT DOCUMENTS

| | | |
|---|---|---|
| EP | 1677497 A1 | 7/2006 |
| WO | WO 2006/013485 A2 | 2/2006 |
| WO | WO 2006/020305 A2 | 2/2006 |
| WO | WO 2007/121557 A1 | 11/2007 |
| WO | WO 2008/033773 A1 | 3/2008 |
| WO | WO 2008/033853 A2 | 3/2008 |
| WO | WO-2008086370 A2 | 7/2008 |
| WO | WO-2008086370 A3 | 7/2008 |
| WO | WO-2008086371 A3 | 7/2008 |

OTHER PUBLICATIONS

Nickitas-Etienne, Athina, Authorized officer, The International Bureau of WIPO, Application No. PCT/US2008/050537, filed Jan. 8, 2008, in International Preliminary Report on Patentability, mailed Jul. 23, 2009, 8 pages.

Kuhnen Leila, Authorized officer, European Patent Office, Application No. PCT/US2008/050538, filed Jan. 8, 2008, in International Search Report and Written Opinion of the International Searching Authority, mailed Jul. 11, 2008, 34 pages.

Nickitas-Etienne, Athina, Authorized officer, The International Bureau of WIPO, Application No. PCT/US2008/050538, filed Jan. 8, 2008, in International Preliminary Report on Patentability, mailed Jul. 23, 2009, 7 pages.

Barber, Brian and Martin Grasdal and Thomas W. Shinder. "Configuring and Troubleshooting Windows XP Professional". 2001. Syngres Publishing, Inc. p. 98-99.

United States Patent and Trademark Office, U.S. Appl. No. 11/676,150, filed Feb. 16, 2007, in Office Action mailed May 13, 2009, 14 pages.

United States Patent and Trademark Office, U.S. Appl. No. 11/676,150, filed Feb. 16, 2007, in Office Action mailed Nov. 4, 2009, 16 pages.

"CoverFlow", www.steelskies.com/coverflow/, downloaded Jun. 15, 2006.

Enright, "Dissatisfaction Sows Innovation—Visual Browsing in iTunes", The Treehouse + The Cave, Dec. 29, 2004, 1-4 pages.

Enright, "Meet CoverFlow", The Treehouse + The Cave, Aug. 13, 2005, 1-2 pages.

Enright, "Visual Browsing on a iBook DS", The Treehouse + The Cave, Dec. 29, 2004, 1 pg.

Sawyer, "Get with the CoverFlow", The Olive Press, Dec. 8, 2005, 1 pg.

Rose, "Music in the Home: Interfaces for Music Applications", Personal Technologies, v. 4, No. 1, 2000, pp. 45-53.

Hinze, Cody, "Cover Flow—A Beautiful Way to Browse your MP3s", Noise Magazine blog, Feb. 5, 2006, pp. 1-2.

"U.S. Appl. No. 11/676,150, Response filed May 6, 2013 to Non-Final Office Action mailed Feb. 5, 2013", 11 pgs.

"U.S. Appl. No. 11/676,150, Advisory Action mailed Jan. 15, 2010", 3 pgs.

"U.S. Appl. No. 11/676,150, Final Office Action mailed Nov. 3, 2011", 20 pgs.

"U.S. Appl. No. 11/676,150, Non Final Office Action mailed Feb. 5, 2013", 10 pgs.

"U.S. Appl. No. 11/676,150, Non Final Office Action mailed Mar. 24, 2011", 15 pgs.

"U.S. Appl. No. 11/676,150, Response filed Jan. 4, 2010 to Final Office Action mailed Nov. 4, 2009", 18 pgs.

"U.S. Appl. No. 11/676,150, Response filed Feb. 3, 2010 to Advisory Action mailed Jan. 15, 2010", 21 pgs.

"U.S. Appl. No. 11/676,150, Response filed Feb. 24, 2012 to Final Office Action mailed Nov. 3, 2011", 10 pgs.

"U.S. Appl. No. 11/676,150, Response filed Jul. 25, 2011 to Non Final Office Action mailed Mar. 24, 2011", 12 pgs.

"U.S. Appl. No. 11/676,150, Response filed Aug. 13, 2009 to Non Final Office Action mailed May 13, 2009", 15 pgs.

* cited by examiner

MONITOR CONFIGURATION FOR MEDIA DEVICE

BACKGROUND

The present disclosure relates to media processing devices, and to systems and methods for performing configuration and error recovery in media processing devices.

Media processing devices can be configured to perform playback of one or more types of media, including audio, images, video, and mixed media. The playback can be performed through one or more embedded outputs, such as speakers and a display, included in the media processing device or through one or more external presentation devices coupled to the media processing device. For example, a media processing device, such as a digital video recorder, can be coupled to a television to present playback of a media stream including video and audio information, such as a movie or a television program. Alternatively, the digital video recorder can be configured to separately provide video information to a television and audio information to an audio receiver that is coupled to one or more speakers.

A wide variety of presentation devices that can be coupled to a media processing device are presently available. Further, presentation device capabilities can vary based on numerous factors, including cost, manufacturer, and intended use. For example, televisions can be configured to support one or more analog video standards, such as NTSC or PAL/SECAM. A television also can be configured to support one or more digital video standards, such as High Definition Television (HDTV) and Enhanced Definition Television (EDTV). Further, a video transmission standard can include more than one resolution. For example, HDTV supports numerous resolutions, including 480p, 720p, and 1080i, where 480p denotes a progressive scan of 480 vertical scanning lines and 1080i denotes an interlaced scan of 1,080 vertical scanning lines. Audio information also can be output in a variety of formats, such as stereo, Dolby Digital, and Dolby Digital EX.

In order to ensure that a media processing device can be used with a variety of separate presentation devices, the media processing device can be configured to structure an output, such as a media stream, in accordance with a plurality of formats. Thus, output information can be provided to a coupled device in a compatible format. The media processing device also can include one or more selection settings, such as through a user interface, to allow a user to specify the desired output format. As such, if the media processing device and the coupled presentation device share multiple common formats, the desired format can be selected. Further, if the presentation device to which the media processing device is coupled changes, such as when a monitor is upgraded, the media processing device can be reconfigured to provide output in an appropriate format to the new presentation device.

SUMMARY

A media processing device, such as a media client that receives media content from one or more sources, can be configured to present output information to one or more presentation devices. Further, a media client can be configured to operate in accordance with a set of associated instructions. Many of these techniques and methods rely on configuring the media client to present output information, such as one or more media streams, in a format that is compatible with the presentation device receiving the information. In order to reduce the time required to select a compatible output format and to prevent configuration errors, the present inventors recognized that it was beneficial to automatically select one or more output formats that are compatible with a coupled presentation device and to configure the media client to utilize one or more of the detected compatible output formats.

The present inventors also recognized the need to automatically detect when a coupled presentation device has changed and to reconfigure the media client to utilize one or more output formats that are compatible with the coupled presentation device. Further, the need to automatically detect and recover from a problem affecting the operation of the media client also is recognized. Accordingly, the techniques and apparatus described here implement algorithms for configuring a media client.

In general, in one aspect, the techniques can be implemented to include identifying a plurality of display modes supported by a media client, wherein the plurality of display modes comprise safe modes; sequentially selecting a display mode from the plurality of display modes, wherein the plurality of display modes are ordered according to one or more of resolution, timing, and popularity; generating an output signal based on the selected display mode, wherein the generated output signal is provided to a display device; and selectively repeating the sequential selection of a display mode and generating an output signal based on the selected display mode until an input is received from a user indicating that the selected display mode is compatible with the display device.

The techniques also can be implemented to include configuring the media client to utilize the selected display mode. Further, the techniques can be implemented to include identifying a plurality of alternative display modes supported by the media client; and selectively repeating the sequential selection of a display mode and generating an output signal based on the selected display mode using the plurality of alternative display modes until an input is received from a user indicating that the selected display mode is compatible with the display device. Additionally, the techniques can be implemented such that the plurality of alternative display modes comprise unsafe modes.

The techniques also can be implemented to include identifying the plurality of display modes based on extended display identification data received from the display device. The techniques further can be implemented such that sequentially selecting a display mode from the plurality of display modes further comprises waiting a predetermined period of time after selecting the display mode to receive input from the user. Additionally, the techniques can be implemented such that sequentially selecting a display mode from the plurality of display modes further comprises receiving a command from the user to select the display mode.

The techniques also can be implemented such that identifying a plurality of display modes supported by a media client further comprises identifying as display modes all safe modes supported by the media client if the display device is coupled to the media client through an analog interface. Further, the techniques can be implemented to include generating an identifier associated with the display device from information included in extended display identification data corresponding to the display device. Additionally, the techniques can be implemented such that the plurality of display modes are ordered from highest resolution to lowest resolution. The techniques further can be implemented such that the generated output signal includes a user prompt. Additionally, the techniques can be implemented such that the plurality of display modes are ordered from most commonly supported to least commonly supported.

In general, in another aspect, the techniques can be implemented as a computer program product, encoded on a computer-readable medium, operable to cause data processing apparatus to perform operations comprising identifying a plurality of display modes supported by a media client, wherein the plurality of display modes comprise safe modes; sequentially selecting a display mode from the plurality of display modes, wherein the plurality of display modes are ordered according to one or more of resolution, timing, and popularity; generating an output signal based on the selected display mode, wherein the generated output signal is provided to a display device; and selectively repeating the sequential selection of a display mode and generating an output signal based on the selected display mode until an input is received from a user indicating that the selected display mode is compatible with the display device.

The techniques also can be implemented to be further operable to cause data processing apparatus to perform operations comprising configuring the media client to utilize the selected display mode. Additionally, the techniques can be implemented to be further operable to cause data processing apparatus to perform operations comprising identifying a plurality of alternative display modes supported by the media client; and selectively repeating the sequential selection of a display mode and generating an output signal based on the selected display mode using the plurality of alternative display modes until an input is received from a user indicating that the selected display mode is compatible with the display device. Further, the techniques can be implemented such that the plurality of alternative display modes comprise unsafe modes.

The techniques also can be implemented to be further operable to cause data processing apparatus to perform operations comprising identifying the plurality of display modes based on extended display identification data received from the display device. Additionally, the techniques can be implemented to be further operable to cause data processing apparatus to perform operations comprising waiting a predetermined period of time after selecting the display mode to receive input from the user. The techniques also can be implemented to be further operable to cause data processing apparatus to perform operations comprising receiving a command from the user to select the display mode.

The techniques also can be implemented to be further operable to cause data processing apparatus to perform operations comprising identifying as display modes all safe modes supported by the media client if the display device is coupled to the media client through an analog interface. Additionally, the techniques can be implemented to be further operable to cause data processing apparatus to perform operations comprising generating an identifier associated with the display device from information included in extended display identification data corresponding to the display device. Further, the techniques can be implemented such that the plurality of display modes are ordered from highest resolution to lowest resolution. Additionally, the techniques can be implemented such that the plurality of display modes are ordered from most commonly supported to least commonly supported. The techniques also can be implemented such that the generated output signal includes a user prompt.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
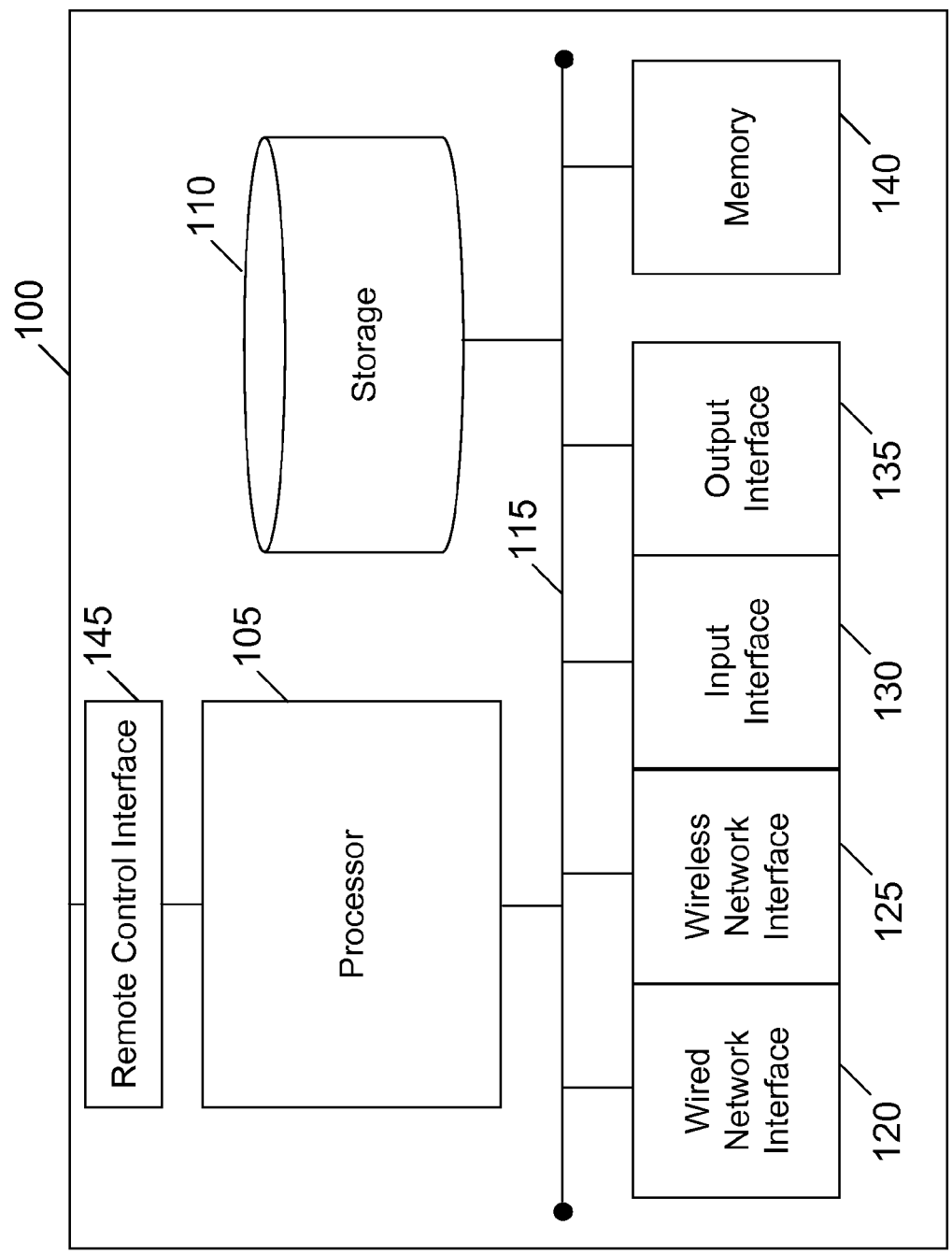
FIG. 1 presents a diagram of a media client.

FIG. 1 presents a media client 100 that can be configured to present one or more types of media through a presentation device, including audio, video, images, or any combination thereof. The media client 100 includes a processor 105 configured to control the operation of the media client 100. For example, the processor 105 can control communications with one or more media servers to receive media for playback. The media can be received through push and/or pull operations, including through downloading and streaming. The processor 105 also can be configured to generate output signals for presentation, such as one or more streams representing media content or an interface for interacting with a user.

The media client 100 also includes a storage device 110 that can be configured to store information including media, configuration data, and operating instructions. The storage device 110 can be any type of non-volatile storage, including a hard disk device or a solid-state drive. For example, media received from an external media server can be stored on the storage device 110. The received media thus can be locally accessed and processed. Further, configuration information, such as the resolution of a coupled display device or information identifying an associated media server, can be stored on the storage device 110. Additionally, the storage device 110 can include operating instructions executed by the processor 105 to control operation of the media client 100. In an implementation, the storage device 110 can be divided into a plurality of partitions, wherein each partition can be utilized to store one or more types of information and can have custom access control provisions.

A communication bus 115 couples the processor 105 to the other components and interfaces included in the media client 100. The communication bus 115 can be configured to permit unidirectional and/or bidirectional communication between the components and interfaces. For example, the processor 105 can retrieve information from and transmit information to the storage device 110 over the communication bus 115. In an implementation, the communication bus 115 can be comprised of a plurality of busses, each of which couples at least one component or interface of the media client 100 with another component or interface.

The media client 100 also includes a plurality of input and output interfaces for communicating with other devices, including media servers and presentation devices. A wired network interface 120 and a wireless network interface 125 each can be configured to permit the media client 100 to transmit and receive information over a network, such as a local area network (LAN) or the Internet. Additionally, an input interface 130 can be configured to receive input from another device through a direct connection, such as a USB or an IEEE 1394 connection.

Further, an output interface 135 can be configured to couple the media client 100 to one or more external devices, including a television, a monitor, an audio receiver, and one or more speakers. For example, the output interface 135 can include one or more of an optical audio interface, an RCA connector interface, a component video interface, and a High-Definition Multimedia Interface (HDMI). The output interface 135 also can be configured to provide one signal, such as an audio stream, to a first device and another signal, such as a video stream, to a second device. Further, a memory 140, such as a random access memory (RAM) and/or a read-only memory (ROM) also can be included in the media client 100. As with the storage device 110, a plurality of types of information, including configuration data and operating instructions, can be stored in the memory 140.

Additionally, the media client 100 can include a remote control interface 145 that can be configured to receive commands from one or more remote control devices (not pictured). The remote control interface 145 can receive the commands through wireless signals, such as infrared and radio frequency signals. The received commands can be utilized, such as by the processor 105, to control media playback or to configure the media client 100. In an implementation, the media client 100 can be configured to receive commands from a user through a touch screen interface. The media client 100 also can be configured to receive commands through one or more other input devices, including a keyboard, a keypad, a touch pad, a voice command system, and a mouse.

Figure 2:
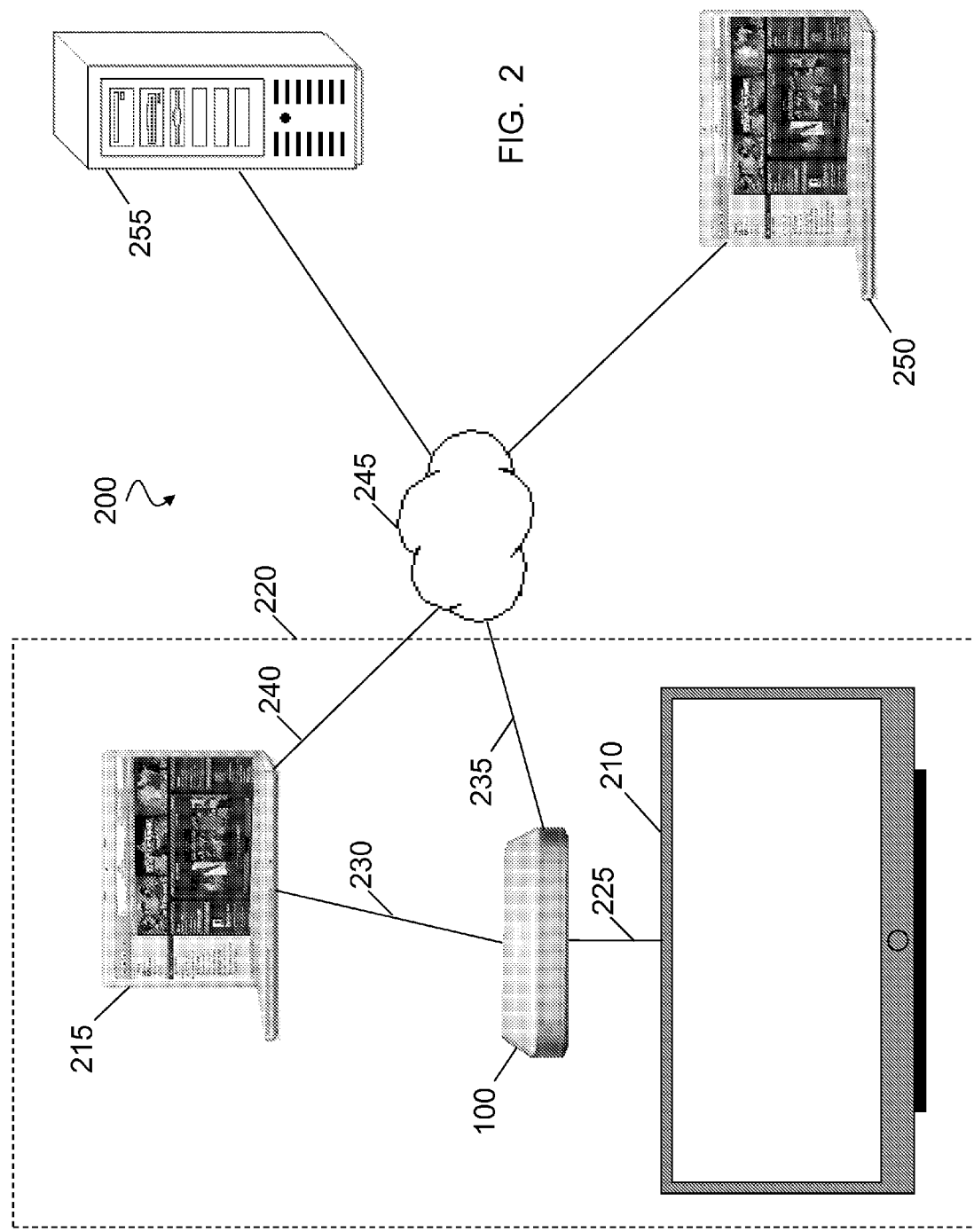
FIG. 2 presents a media system that includes a media client.

FIG. 2 presents a media system 200 that includes a media client 100. The media system 200 includes a host location 220, such as a home or office, in which the media client 100 is installed. The host location 220 also can include a local media server 215 and a presentation device, such as a monitor 210. The monitor 210 can be coupled to the media client 100 through a media connector 225, such that video and/or audio information output by the media client 100 can be presented through the monitor 210. Further, the media client 100 can be coupled to the local media server 215 through a local connection 230, such as a wired network connection, a wireless network connection, or a direct connection. As such, the media client 100 can receive media content from the local media server 215. The local media server 215 can be any computing device, including a personal computer, a server, a palm top computer, or a media device capable of storing and/or playing back media content.

Further, the media client 100 and the local media server 215 can include network connections 235 and 240 respectively, which provide access to a network 245, such as the Internet. In an implementation, the media client 100 can communicate with a remote media server 250 and/or a media store 255 over the network 245. For example, a connection can be established between the media client 100 and the remote media server 250. The connection can be secure or unsecure. Thereafter, the media client 100 can receive media content from the remote media server 250, such as by streaming or downloading.

Similarly, the media client 100 can be configured to receive media content from a media store 255. For example, upon establishing a connection, the media client 100 can request a list of available media content from the media store 255. The list of available media content can include free content, such as trailers and pod casts, and for-purchase content, such as movies, television programs, and music. Additionally, the media client 100 can be configured to communicate with the media store 255 to validate media content, such as by verifying digital rights management information.

Figure 3:
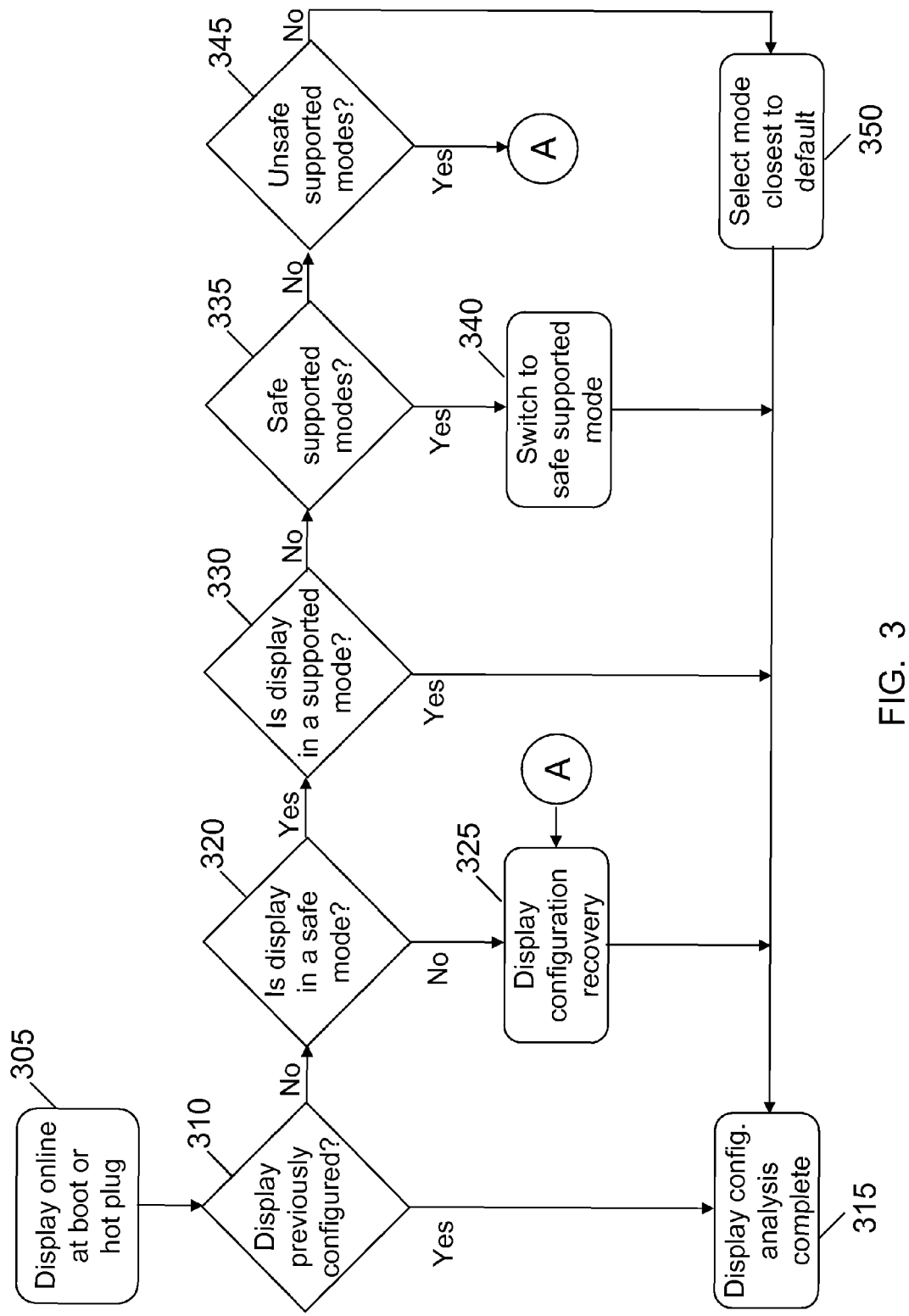
FIG. 3 presents a flowchart for analyzing a display configuration.

A media processing device, such as the media client 100, can be configured to select a particular display mode corresponding to the output of video or image data to a display device in response to any one of a plurality of display configuration events, including media processing device initialization (also referred to as "boot"), change of a coupled display device during operation (also referred to as "hot plug"), display error or detection of an unsafe mode, and user command. A display mode can identify both a display resolution and a timing. FIG. 3 presents a flowchart for analyzing a display configuration.

The media client 100 can determine whether a display device is online when the media client 100 is initialized or when a coupled display device is changed during media client operation (305). Further, the media client 100 can determine whether the display device has previously been configured (310). For example, on boot, the media client 100 can determine whether the display device settings were restored from saved preferences.

Further, if the display device is configured to transmit Extended Display Identification Data (EDID), the media client 100 also can recognize the display device from the EDID. In an implementation, one or more of the values in the EDID, including the manufacturer name, product type, phosphor or filter type, timings supported by the display, display size, luminance data, and pixel mapping data, can be hashed to generate an identifier associated with the display device. The hashed identifier can be used to verify the identity of the display device during a boot or hot plug event. The EDID also can be used to determine the capabilities of the display device. If the display device has previously been configured, the display configuration analysis can be terminated (315).

If the display device has not previously been configured, the media client 100 can determine whether the existing display configuration corresponds to a safe mode (320). One or more of the display modes supported by the media client 100 can be predetermined to be safe. For example, all HDMI display modes can be designated as safe modes. Similarly, one or more display modes also can be predetermined to be unsafe. For example, the media client 100 can be configured to designate all display modes that utilize analog component timings as unsafe. If the existing display configuration does not correspond to a safe mode, a display configuration process, which is described in greater detail with respect to FIG. 4, can be executed (325). Once the display configuration process is complete, the display configuration analysis can be terminated (315).

If it is determined that the display configuration corresponds to a safe mode, the media client 100 can determine whether the display device also is in a display mode supported by the media client 100 (330). This can be performed using the EDID or through user confirmation. If the display device is operating in a safe mode that is supported by the media client 100, the display configuration analysis can be terminated (315). Otherwise, the media client 100 can determine whether the display device supports one or more safe modes that also are supported by the media client 100 (335). If the display device can operate in one or more safe modes supported by the media client 100, the media client 100 can configure the output to correspond to one of the supported safe modes (340). For example, the media client 100 can be configured to select the compatible safe mode with the highest possible resolution. Once the media client 100 has been configured to output information to the display device in a compatible safe mode, the display configuration analysis can be terminated (315).

If the media client 100 determines that the display device cannot operate in any of the supported safe modes, the media client 100 further can determine whether the display device can operate in any unsafe modes that are supported by the media client 100 (345). If the display device can operate in an unsafe mode supported by the media client 100, a display configuration process can be executed (325). If the display device cannot operate in an unsafe mode supported by the media client 100, a compatible display mode closest to a default display mode can be selected (350). For example, a default display mode can be specified in the media client 100, such as a resolution of 720p and a timing of 60 Hz. If the media client 100 does not support a display mode that is compatible with a mode supported by the display device, then the media client 100 can select the display mode closest to the default mode that produces visible output on the display device. Once visible output is presented on the display device and confirmed by user input, the display configuration analysis can be terminated (315).

Figure 4:
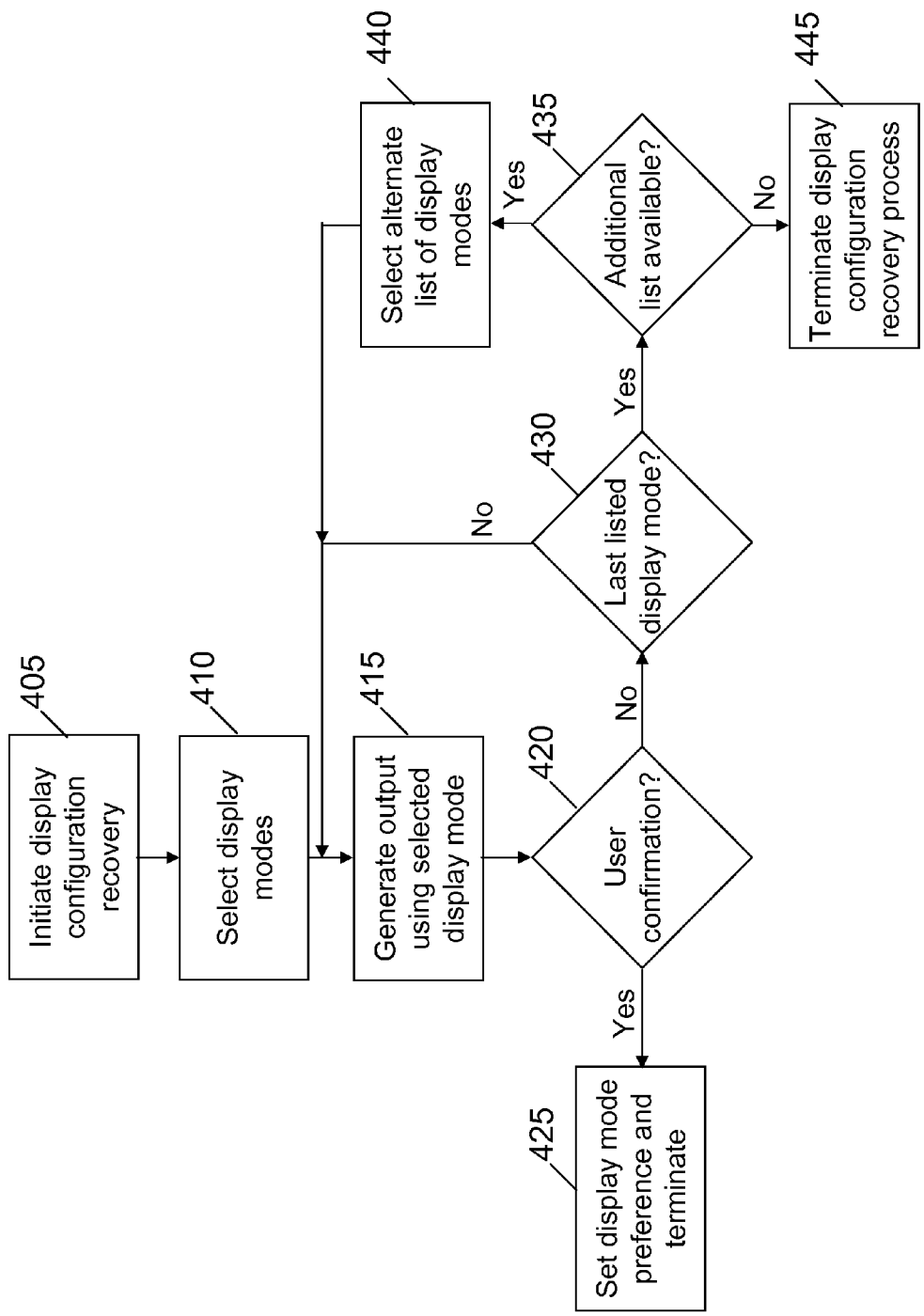
FIG. 4 presents a flowchart for performing a display configuration process.

FIG. 4 presents a flowchart for performing a display configuration process. In addition to responding to circumstances detected during a boot or hot plug event, the display configuration process also can be initiated in response to a command received from a user, such as through the selection of an option in a user interface or through one or more commands entered into a remote control device (405). In an implementation, a command can be received from a user through another input supported by the media client 100, including a touch screen, a keyboard, a keypad, a touch pad, a voice command system, and a mouse.

A media processing device, such as the media client 100, executing the display configuration process can select a list of one or more primary display modes (410). In an implementation, the list of primary display modes can be specified such that only safe modes are included. In another implementation, the list of primary display modes can be selected based on information included in the EDID received from a display device. Thus, one or more display modes not supported by the display device can be omitted from the list of primary display modes. The media client 100 can be configured to cycle through the list of primary display modes sequentially until a supported display mode that is compatible with the display device is identified. Further, a list of display modes also can be ordered based on one or more criteria, such as resolution or how commonly they are supported. For example, the most commonly supported display mode in a list can be ordered first, while the least commonly supported display mode can be ordered last. TABLE 1 presents an exemplary list of display modes.

| USER INTERFACE | RESOLUTION | TIMING |
| --- | --- | --- |
| 720p | 1280 × 720 | 720p60 |
| 720p | 1280 × 720 | 720p50 |
| 1080i | 1280 × 720 | 1080i60 |
| 1080i | 1280 × 720 | 1080i50 |
| 480p | 720 × 480 | 480p60 |
| 480i | 720 × 480 | 480i60 |
| 576p | 1024 × 576 | 576p |
| 576i | 1024 × 576 | 576i |

Further, the order in which the media client 100 cycles through a list of display modes can be set based on one or more preferences, such that one or more preferred display modes are attempted before other supported display modes. Thus, if a preferred display mode is compatible with the display device, the preferred display mode can be selected. For example, if the output of the media client 100 is optimized for standard high-definition display modes, the supported standard high-definition display modes can be attempted before other display modes. Similarly, if other high-definition display modes are preferred over standard definition modes, the other high-definition modes can be attempted before any of the standard definition modes. In this manner, the most highly preferred display mode that also is compatible with the display device can be selected.

The media client 100 generates output to the display device using a selected display mode from the current list of display modes (415). The output can include a prompt requesting the user to perform an action, such as entering a command, if the generated output is visible on the display device. The media client 100 can continue to generate output to the display device using the selected display mode for a predetermined period of time if no user input is received. For example, output can be transmitted to the display device using the selected display mode for at least 8 seconds in order to give a user time to respond to a displayed prompt. Additionally, the media client 100 can present audio output to a user. For example, the media client 100 can output a tone to indicate that a new display mode is being attempted. Further, a different tone can be associated with other events, such as completing a traversal of the selected list of display modes or selecting a new list of display modes. During the predetermined period of time, the media client 100 can determine whether input has been received confirming that the generated output is visible on the display device (420). If user input has been received, the selected display mode can be recorded by the media client 100, such as in a preference file, and the display configuration process can be terminated (425).

If no user input is received during the predetermined period, the media client 100 can determine whether any other display modes remain in the current list of display modes (430). If at least one display mode remains, the media client 100 can generate output to the display device using a selected display mode from the current list (415). If all of the display modes in the current list of display modes have been attempted, the media client 100 can determine whether a list of alternative display modes is available (435). If a list of alternative display modes is available, the list is selected as the current list (440). The media client 100 can then generate output to the display device using a selected display mode from the current list (415).

If all of the display modes in the current list have been attempted and an alternative list of display modes is not available, the display configuration process is terminated (445). If all supported safe and unsafe modes have been attempted, the media client 100 can select a default display mode as part of the termination. In an implementation, the user can be instructed to verify the connection between the display device and the media client 100, and to then repeat the display configuration process.

In another implementation, the media client 100 can be configured to perform the display configuration process in accordance with commands received from a user. For example, the user can be permitted to increase the speed at which the display modes are attempted and/or manually control the progression from one display mode to the next. Similarly, the user can be permitted to move backward in the current list to select a display mode that already has been attempted.

If input is not received from the user, the media client 100 can execute the display configuration process automatically The media client 100 also can be configured to select between normal and wide screen modes in a separate process. For example, the 576p display mode can have a resolution of 1024×576 when in 16:9 and a resolution of 768×576 when in 4:3. In an implementation, selection between normal and wide screen modes can be implemented as part of a configuration menu displayed in a user interface.

Figure 5:
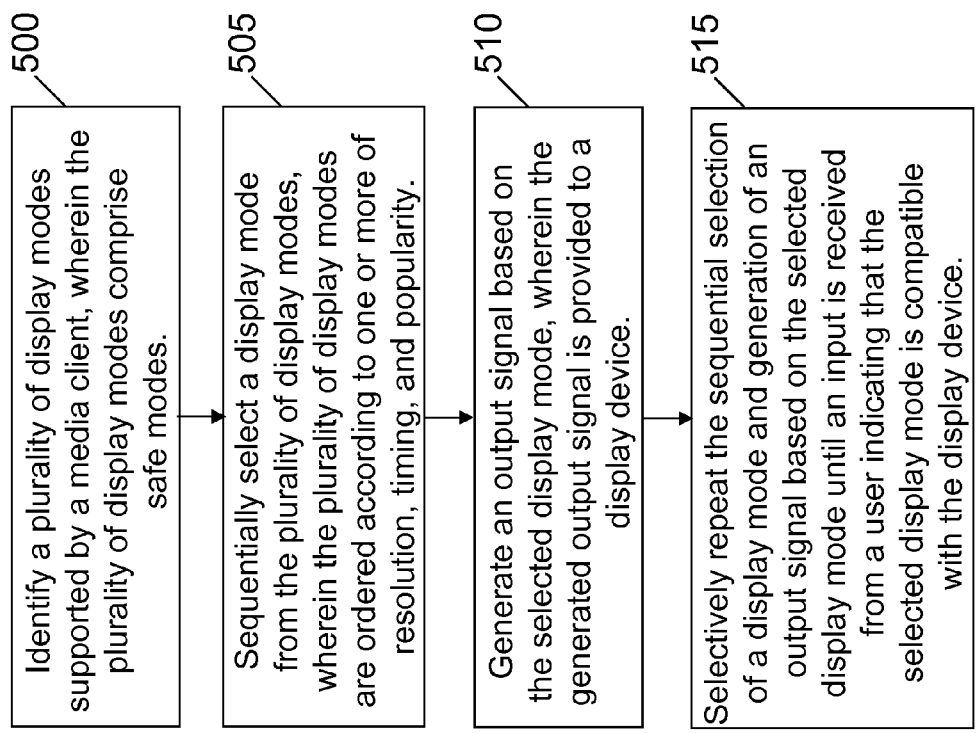
FIG. 5 presents computer-implemented method of selecting a display mode.

FIG. 5 describes a computer-implemented method of selecting a display mode. In a first step 500, a plurality of display modes supported by a media client are identified, wherein the plurality of display modes comprise safe modes. In a second step 505, a display mode is sequentially selected from the plurality of display modes, wherein the plurality of display modes are ordered according to one or more of resolution, timing, and popularity. In a third step 510, an output signal based on the selected display mode is generated, wherein the generated output signal is provided to a display device. Once a display mode has been sequentially selected and an output signal based on the selected display mode has been generated, a fourth step 515 is to selectively repeat the sequential selection of a display mode and generation of an output signal based on the selected display mode until an input is received from a user indicating that the selected display mode is compatible with the display device.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method of selecting a display mode, the method comprising:
    determining, using one or more processing units, display modes supported by a media client, including safe modes and one or more unsafe modes;
    selecting, using the one or more processing units, a plurality of display modes from the determined display modes, wherein each of the plurality of display modes corresponds to a safe mode;
    sequentially selecting, using the one or more processing units, a display mode from the plurality of display modes, wherein the plurality of display modes are ordered according to one or more of resolution, timing, and popularity;
    generating, using the one or more processing units, an output signal based upon the selected display mode, wherein the generated output signal is provided to a display device;
    selectively repeating, using the one or more processing units, the sequential selection of a display mode from the plurality of display modes, and generating an output signal based upon the selected display mode, wherein the sequential selection is selectively repeated until a selected display mode is determined to be compatible with the display device or until all of the display modes in the plurality of display modes have been sequentially selected;
    selecting, using the one or more processing units, a plurality of alternative display modes when all of the display modes have been sequentially selected, wherein each alternative display mode is supported by the media client, and wherein the plurality of alternative display modes includes one or more unsafe modes; and
    selectively repeating, using the one or more processing units, the sequential selection of a display mode from the plurality of alternative display modes, and generating an output signal based upon the selected display mode, wherein the sequential selection is selectively repeated until a selected display mode is determined to be compatible with the display device.

2. The method of claim 1, further comprising:
    configuring the media client to utilize the selected display mode.

3. The method of claim 1, further comprising:
    selecting the plurality of display modes based upon extended display identification data received from the display device.

4. The method of claim 1, wherein sequentially selecting a display mode from the plurality of display modes further comprises:
    waiting a predetermined amount of time for a determination that a selected display mode is compatible with the display device, wherein the predetermined amount of time begins after the selection of a display mode.

5. The method of claim 1, wherein sequentially selecting a display mode further comprises:
    receiving an indication selecting the display mode.

6. The method of claim 1, wherein selecting a plurality of display modes further comprises:
    selecting safe modes supported by the media client if the display device is coupled to the media client through an analog interface.

7. The method of claim 1, further comprising:
    generating an identifier associated with the display device from information included in extended display identification data corresponding to the display device.

8. The method of claim 1, wherein the plurality of display modes are ordered from highest resolution to lowest resolution.

9. The method of claim 1, wherein the plurality of display modes are ordered from most commonly supported to least commonly supported.

10. The method of claim 1, wherein the generated output signal includes a user prompt.

11. The method of claim 1, further comprising:
    prior to performing the steps of claim 1, determining that the display device is not in a safe mode; and
    in response to determining that the display device is not in a safe mode, performing the steps of claim 1.

12. The method of claim 1, further comprising:
    prior to performing the steps of claim 1, determining that the display device does not support a safe mode also supported by the media client; and
    in response to determining that the display device does not support a safe mode also supported by the media client, checking for a compatible mode by performing the steps of claim 1.

13. A computer program product, encoded on a non-transitory computer-readable medium, operable to cause data processing apparatus to perform operations comprising:
    determining display modes supported by a media client, including safe modes and one or more unsafe modes;
    selecting a plurality of display modes from the determined display modes, wherein each of the plurality of display modes corresponds to a safe mode;
    sequentially selecting a display mode from the plurality of display modes, wherein the plurality of display modes are ordered according to one or more of resolution, timing, and popularity;
    generating an output signal based upon the selected display mode, wherein the generated output signal is provided to a display device;
    selectively repeating the sequential selection of a display mode from the plurality of display modes, and generating an output signal based upon the selected display mode, wherein the sequential selection is selectively repeated until a selected display mode is determined to be compatible with the display device or until all of the display modes in the plurality of display modes have been sequentially selected;

selecting a plurality of alternative display modes when all of the display modes have been sequentially selected, wherein each alternative display mode is supported by the media client, and wherein the plurality of alternative display modes includes one or more unsafe modes; and selectively repeating the sequential selection of a display mode from the plurality of alternative display modes, and generating an output signal based upon the selected display mode, wherein the sequential selection is selectively repeated until a selected display mode is determined to be compatible with the display device.

14. The computer program product of claim 13, further operable to cause data processing apparatus to perform operations comprising:

configuring the media client to utilize the selected display mode.

15. The computer program product of claim 13, further operable to cause data processing apparatus to perform operations comprising:

selecting the plurality of display modes based upon extended display identification data received from the display device.

16. The computer program product of claim 13, further operable to cause data processing apparatus to perform operations comprising:

waiting a predetermined amount of time for a determination that a selected display mode is compatible with the display device, wherein the predetermined amount of time begins after the selection of a display mode.

17. The computer program product of claim 13, further operable to cause data processing apparatus to perform operations comprising:

receiving an indication selecting the display mode.

18. The computer program product of claim 13, further operable to cause data processing apparatus to perform operations comprising:

selecting safe modes supported by the media client if the display device is coupled to the media client through an analog interface.

19. The computer program product of claim 13, further operable to cause data processing apparatus to perform operations comprising:

generating an identifier associated with the display device from information included in extended display identification data corresponding to the display device.

20. The computer program product of claim 13, wherein the plurality of display modes are ordered from highest resolution to lowest resolution.

21. The computer program product of claim 13, wherein the plurality of display modes are ordered from most commonly supported to least commonly supported.

22. The computer program product of claim 13, wherein the generated output signal includes a user prompt.

23. The computer program product of claim 13, further operable to cause data processing apparatus to perform operations comprising:

prior to performing the operations of claim 13, determining that the display device is not in a safe mode; and in response to determining that the display device is not in a safe mode, performing the operations of claim 13.

24. The computer program product of claim 13, further operable to cause data processing apparatus to perform operations comprising:

prior to performing the operations of claim 13, determining that the display device does not support a safe mode also supported by the media client; and in response to determining that the display device does not support a safe mode also supported by the media client, checking for a compatible mode by performing the operations of claim 13.

25. A system, comprising:

one or more processors;

a non-transitory computer-readable storage medium containing instructions configured to cause the one or more processors to perform operations, including:

determining display modes supported by a media client, including safe modes and one or more unsafe modes;

selecting a plurality of display modes from the determined display modes, wherein each of the plurality of display modes corresponds to a safe mode;

sequentially selecting a display mode from the plurality of display modes, wherein the plurality of display modes are ordered according to one or more of resolution, timing, and popularity;

generating an output signal based upon the selected display mode, wherein the generated output signal is provided to a display device;

selectively repeating the sequential selection of a display mode from the plurality of display modes, and generating an output signal based upon the selected display mode, wherein the sequential selection is selectively repeated until a selected display mode is determined to be compatible with the display device or until all of the display modes in the plurality of display modes have been sequentially selected;

selecting a plurality of alternative display modes when all of the display modes have been sequentially selected, wherein each alternative display mode is supported by the media client, and wherein the plurality of alternative display modes includes one or more unsafe modes; and selectively repeating the sequential selection of a display mode from the plurality of alternative display modes, and generating an output signal based upon the selected display mode, wherein the sequential selection is selectively repeated until a selected display mode is determined to be compatible with the display device.

* * * * *